(12) United States Patent
Adams

(10) Patent No.: US 6,861,641 B1
(45) Date of Patent: Mar. 1, 2005

(54) HERMETICALLY SEALED OPTICAL SUBASSEMBLY

(75) Inventor: Rich Adams, Boulder, CO (US)

(73) Assignee: Optical Communication Products, Inc., Woodland Hills, CA (US)

(*) Notice: Subject to any disclaimer, the term of this patent is extended or adjusted under 35 U.S.C. 154(b) by 0 days.

(21) Appl. No.: 10/106,710

(22) Filed: Mar. 26, 2002

(51) Int. Cl.[7] .......................... H01J 40/14; H01J 5/02
(52) U.S. Cl. .................. 250/239; 385/92; 359/362
(58) Field of Search ............. 250/239; 385/88–94, 385/140; 359/362

(56) References Cited

U.S. PATENT DOCUMENTS

| | | | | |
|---|---|---|---|---|
| 4,616,899 A | * | 10/1986 | Schlafer ................. | 385/93 |
| 4,803,689 A | * | 2/1989 | Shibanuma ............. | 385/49 |
| 5,511,140 A | * | 4/1996 | Cina et al. .............. | 385/93 |
| 5,631,987 A | * | 5/1997 | Lasky et al. ............ | 385/88 |
| 6,061,493 A | * | 5/2000 | Gilliland et al. ........ | 385/140 |
| 6,302,596 B1 | * | 10/2001 | Cohen et al. ........... | 385/93 |
| 6,686,588 B1 | * | 2/2004 | Webster et al. ........ | 250/239 |

* cited by examiner

Primary Examiner—Thanh X. Luu
Assistant Examiner—Seung C. Sohn
(74) Attorney, Agent, or Firm—Barlow, Josephs & Holmes, Ltd.

(57) ABSTRACT

An optical subassembly includes a high speed ceramic substrate having cavity containing an array of photodetectors, and a glass or silicon window for covering the cavity and forming a hermetic seal. A retainer is attached to the window for direct or indirect attachment to a fiber. The hermetic seal protects the device from moisture and other environmental conditions. The window has an index of refraction higher than air that effectively increases the optical pathlength sufficient while maintaining an acceptable coupling efficiency between the optoelectronic device and a fiber. This provides increased spacing within which to place and interconnect components within the cavity on the substrate. In alternate embodiments, the window is decoupled from direct contact with the retainer via a metal frame or ring. Decoupling the window from direct contact with the retainer helps prevent cracking of the window due to mismatches in the coefficients of thermal expansion between the window and the retainer.

9 Claims, 8 Drawing Sheets

HERMETICALLY SEALED OPTICAL SUBASSEMBLY

FIELD OF THE INVENTION

The present invention relates generally to optoelectronic receivers, and more particularly to a hermetically sealed array receiver optical assembly (ROSA). Although described herein with respect to ROSAs, it should be understood that the present invention may also be applied to transmitters.

BACKGROUND

Optoelectronic devices used in fiber optic communication transmitters and/or receivers are typically required to perform in varying environmental conditions and within tight specifications and tolerances. As the accumulation of moisture may have a detrimental effect on such components, it is beneficial to provide protection of the components from moisture.

In the specific case of a photodiode array ROSA on a ceramic substrate, the ROSA typically includes a metal retainer that is directly attached to a ferrule that houses an array of fibers. As it is typically necessary to place the photodiode array a relatively short distance from the ends of the fibers to maintain sufficient optical coupling, the space within the ceramic substrate within which to mount and wirebond the photodiode array is often tight and difficult to work with.

SUMMARY

An exemplary embodiment of the present invention provides an optical subassembly including a hermetic seal for protecting optoelectronic devices such as photodetectors and associated components from moisture via a window, transparent to light from the fiber. In another embodiment, the window is decoupled from direct contact with certain components of the optical subassembly, such as the metal FSA retainer, that have coefficients of thermal expansion which differ significantly from that of the window. In another embodiment, the window also enables an increase in the distance from the fiber-ends to the face of the optoelectronic device while maintaining and optimizing coupling efficiency.

BRIEF DESCRIPTION OF THE DRAWINGS

These and other features of the present invention will be better understood with reference to the following detailed description and accompanying drawings, wherein.

DETAILED DESCRIPTION

Figure 1:
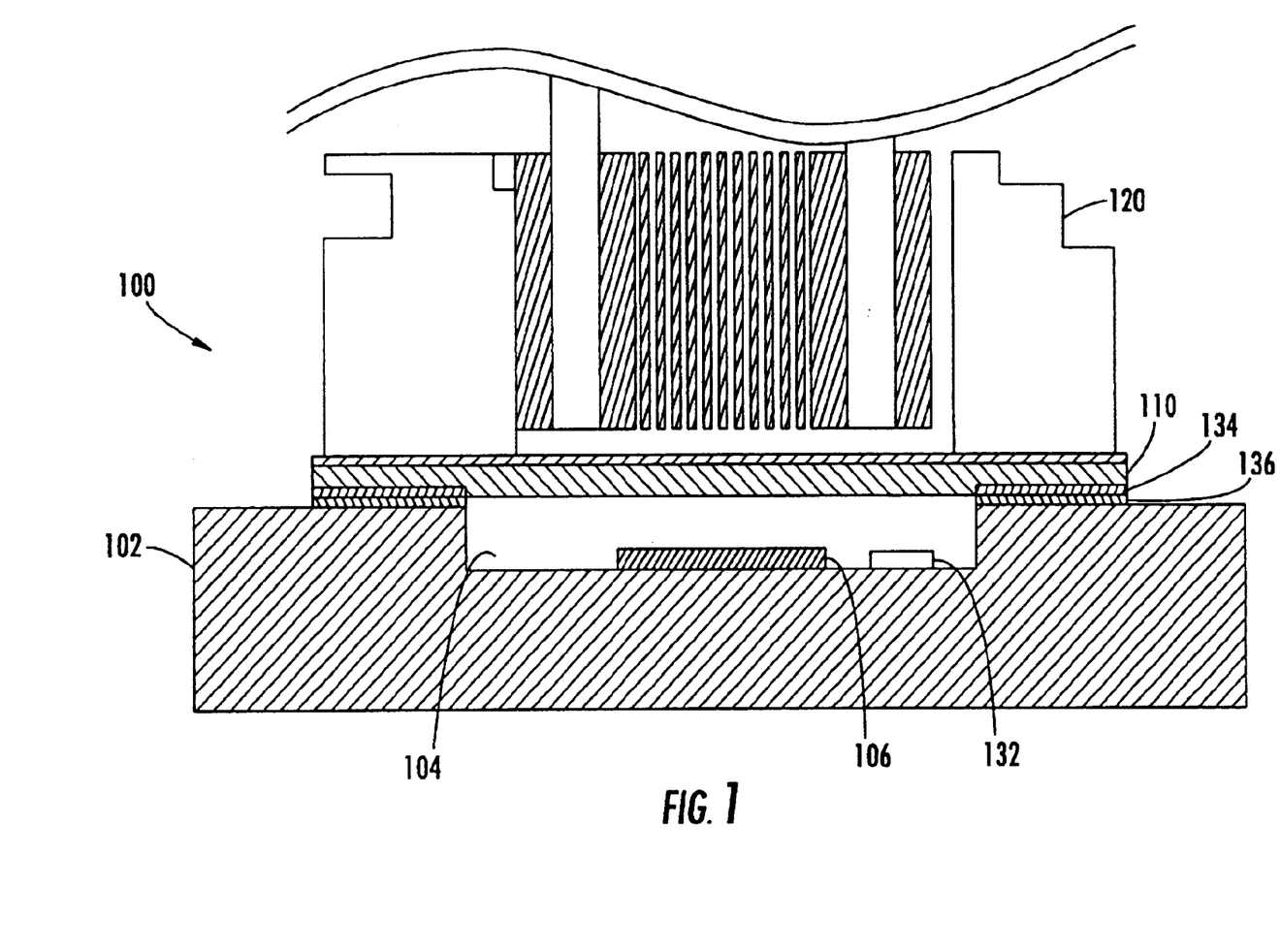
FIG. 1 is a side view, partly in cross section, of a hermetically sealed optical subassembly according to an exemplary embodiment of the present invention.

Referring to FIG. 1, a ROSA 100 according to one embodiment includes a ceramic substrate 102 with a cavity 104, an optoelectronic device such as a photodetector array die (e.g., PIN array) 106, a window 110 and a fiber stub array (FSA) retainer 120. The window 110 may be silicon, glass, sapphire or other material that passes some or all of the light at the wavelength of the optoelectronic device. The retainer 120 typically couples the ROSA to a conventional MT type ferrule connector (not shown) or similar connector. Alternatively, as is known in the art, a bridging device (231) may be used to provide an interface to the ferrule. For convenience, the MT ferrule or any coupling or bridging device formed as part of the optical subassembly is referred to herein as the FSA retainer. Further, the terms "FSA retainer" or "retainer" as used herein are meant to include any mechanism for facilitating attachment of one or more optical fibers to the assembly. The cavity 104 houses the PIN array 106 and associated circuitry 132. The associated circuitry may include, for example, a transimpedance amplifier and other circuitry for monitoring optical signals that impinge the photodetectors of the PIN array 106 in the exemplary embodiment.

In practice, the ROSA of FIG. 1 is constructed by first attaching the PIN array 106 and associated circuitry to the substrate within the cavity and wirebonding or otherwise electrically enabling the array. The window 110 is then metalized 134 and attached to the substrate by means of reflow solder 136 or other suitable attachment. Exemplary materials for metalization include an 80–120 nm coat of Cr or Ti, a 400 nm coat of Ni or Ni—V, or a 120–200 nm coat of Au. As will be appreciated, other materials or ranges of coating thickness may be used.

Solder sealing the window 110 to the substrate 102 over the cavity 104 provides a hermetic seal that protects the components from performance degradation due to moisture. In one embodiment, the seal meets the requirements of MIL-SPEC 833D, but it is not necessary in the exemplary embodiment that the seal meets the requirements of the MIL-SPEC. The solder may also provide a buffering effect to counter the coefficient of thermal expansion (CTE) mismatch between the window and the ceramic. The retainer is then actively aligned to the PIN array, and UV-cured epoxy or other suitable material is used to fix the retainer directly to the window 110 relative to the array 106. One suitable epoxy is marketed under the tradename Ablestik A789-4 by Ablestik Laboratories, Rancho Dominguez, Calif.

In the exemplary embodiment, the window 110 is transparent to light having a nominal wavelength of 1310 nm. Silicon (Si) is suitable for this application. Other material may be used to provide transparency at the desired wavelength. The higher index of refraction of Si relative to air enables increased distance between the fiber ends and the PIN array 106 without compromising coupling efficiency, thereby providing increased physical spacing within which to attach the PIN array and associated circuitry. Alternative materials besides Si may also be used to derive the benefit described herein.

In some cases, however, the use of epoxy as a bonding agent between the retainer 120, which is typically made of a metal such as stainless steel, and the silicon lid (or ceramic) may not provide adequate and sustainable registration between the active components. Epoxy joints, for example, may be prone to failure in high temperature and high humidity environments. This may be due to the hygroscopic nature of epoxy, as well as its high coefficient of thermal expansion relative to silicon or ceramic.

Further, Si is a relatively brittle material with a coefficient of thermal expansion that differs from that of the metal FSA retainer. Exemplary CTE values (ppm/degree C.) include the following: FSA—13; Retainer—11.5; Silicon—4.2; Ceramic (Alumina)—6.6; and Epoxy—25. As the difference between the CTE of silicon and the retainer is relatively large, the Si may crack due to temperature changes when directly attached to the retainer.

Figure 2:
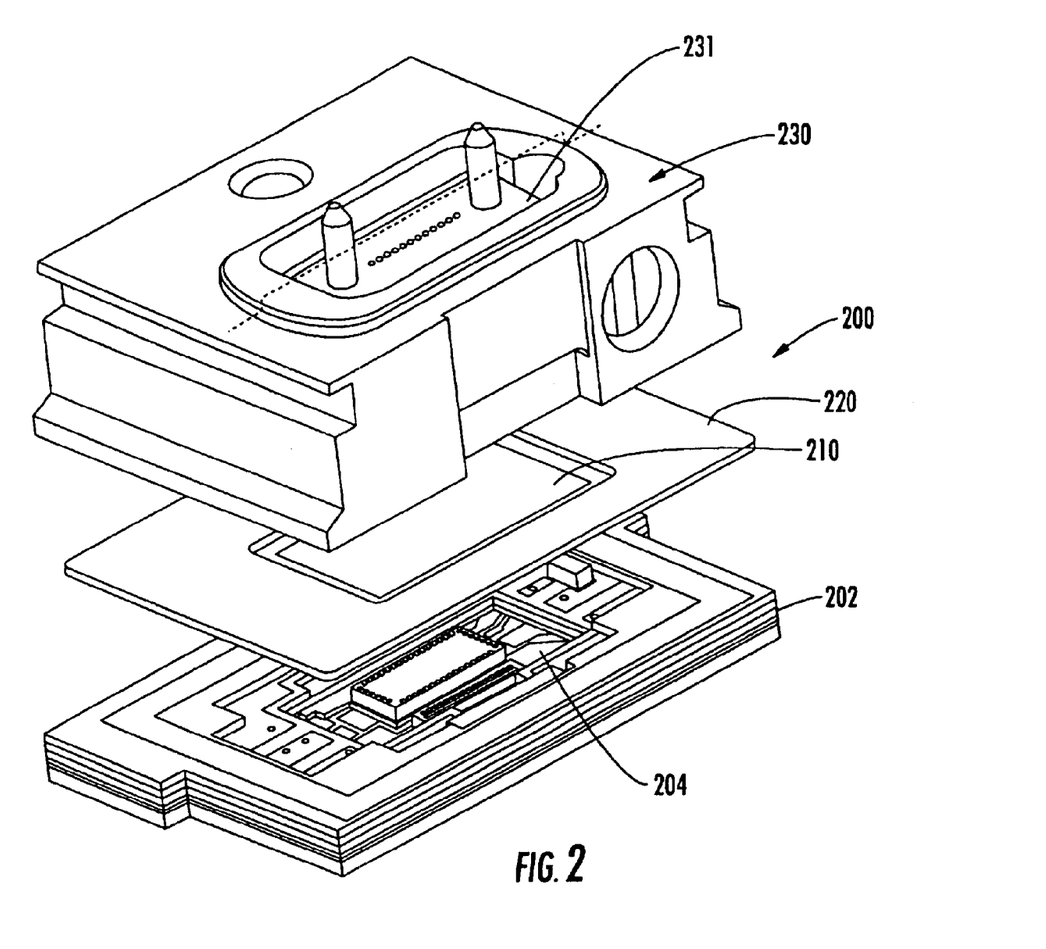
FIG. 2 is a perspective view of various components of a hermetically sealed optical subassembly according to an alternate embodiment of the present invention.

Referring to FIG. 2, in an alternate embodiment, the window is decoupled from (i.e, not directly attached to) the FSA retainer. The hermetically sealed optical subassembly 200 of FIG. 2 includes a ceramic substrate 202 with a cavity 204 for housing a PIN array 206 and associated components 208, a window 210, a frame 220 and an FSA retainer 230.

The frame 220 may be Kovar or Alloy 52 or some other material having a coefficient of thermal expansion compatible with the CTE of the silicon, glass, sapphire or other material forming the window. The frame may also be formed of other materials from a class of metals known to have a CTE very similar to the material forming the window. Suitable alloys include, for example:

TABLE 1

| ALLOY | UNS | ASTM | MILITARY | AMS |
|---|---|---|---|---|
| Kovar | K94610, K94630 | F-15, F-1466 | Mil-1-23011C Class 1 | 7726B, 7727, 7728C |
| 52 Alloy | N14052 | F-30 | Mil-I-23011C Class 2 | |
| 48 Alloy | K94800 | F-30 | Mil-I-23011C Class 3 | |
| 46 Alloy | K94600 | F-30 | Mil-I-23011C Class 4 | |
| 42 Alloy | K94100 | F-30 | Mil-I-23011C Class 5 | |
| 42-6 Alloy | K94760 | F-31 | Mil-I-23011C Class 6 | |
| | K93601 | A-658, B-753 | Mil-I-23011C Class 7 | |
| Invar 36 | K93602 | F-1684 (96) | Mil-S-16598B (Invar FM) | |

Figure 2A:
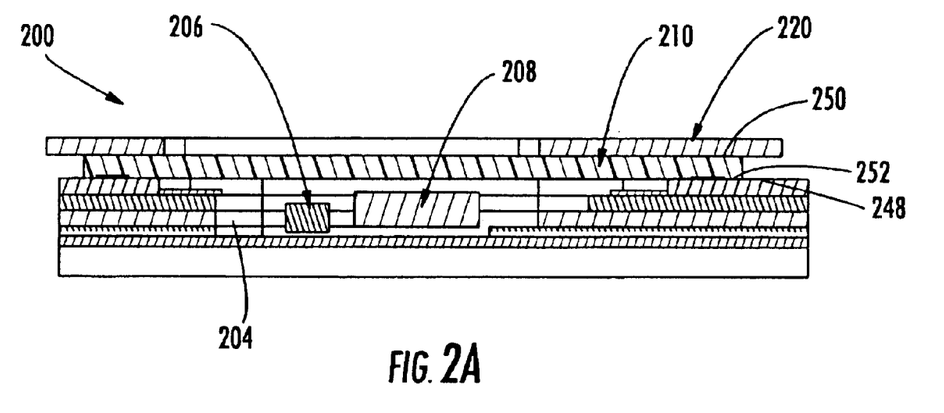
FIG. 2A is a side view, partly in cross section, of the hermetically sealed optical subassembly of FIG. 2.
Figure 2B:
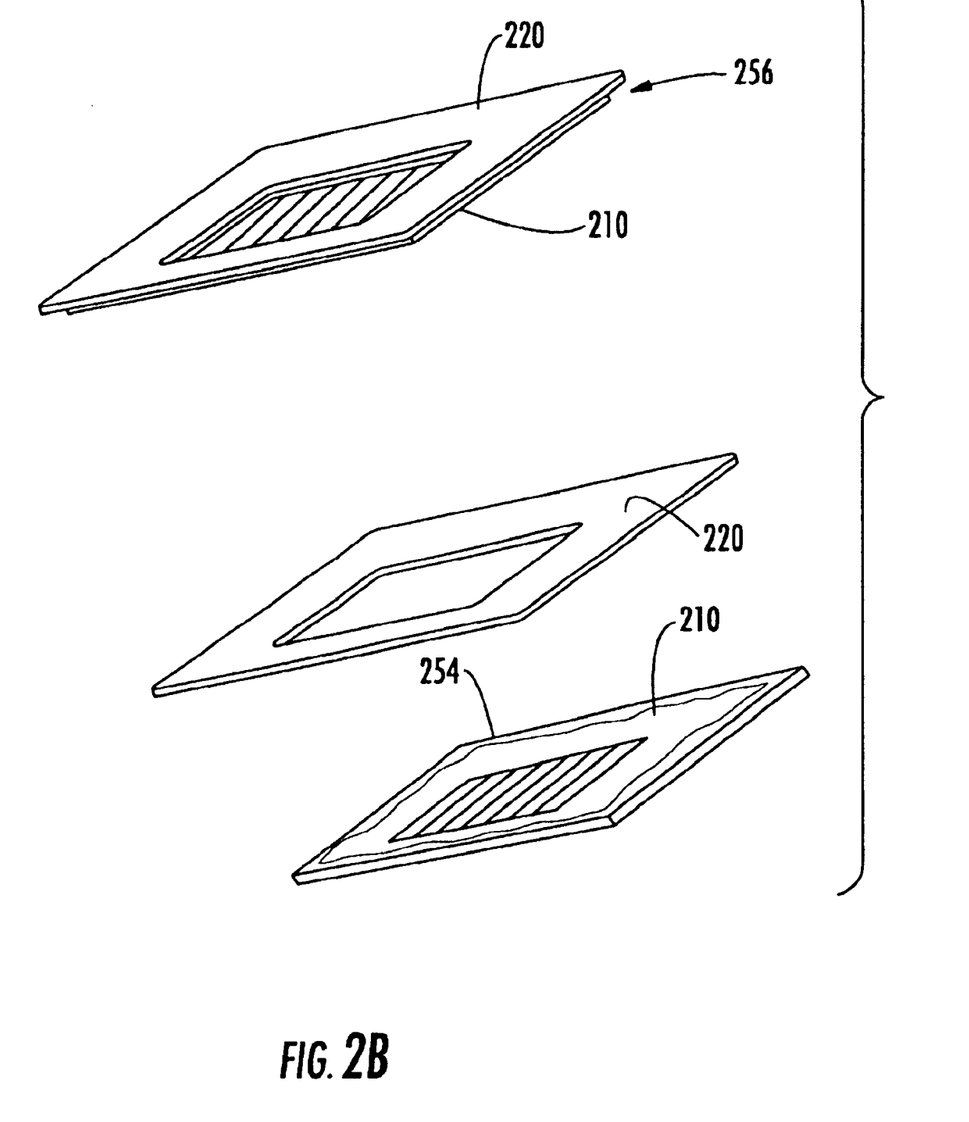
FIG. 2B is a perspective view of a portion of the embodiment of FIG. 2 illustrating a window subassembly including a silicon window and metal frame.

Referring also to FIGS. 2A and 2B, to manufacture the embodiment of FIG. 2, the PIN array and associated circuitry are assembled to the ceramic substrate. The periphery 246 of one side 248 of the silicon window is metalized 252 as described with respect to the embodiment of FIG. 1. The other side 250 of the silicon window is then attached to the frame using, for example, a glass frit or glass solder 254. This forms a silicon window subassembly 256 that may be attached over the cavity using a suitable solder to create a hermetic seal. The window subassembly may also serve as a platform for laser welding the FSA retainer 230. The FSA retainer may then be aligned and laser welded to the frame.

An advantage of this embodiment is that it eliminates the epoxy bond and strengthens the crack resistance of the Si window by decoupling the window from the retainer by use of the metal frame. Further, the width of the metal frame may be chosen separately or in combination with the width and index of refraction of the window to passively set the Z-height and maximize coupling efficiency between the fiber and the optoelectronic device. With the Z-height fixed, active alignment may focus on X and Y-axis alignment, thereby simplifying the alignment process.

Figure 3:
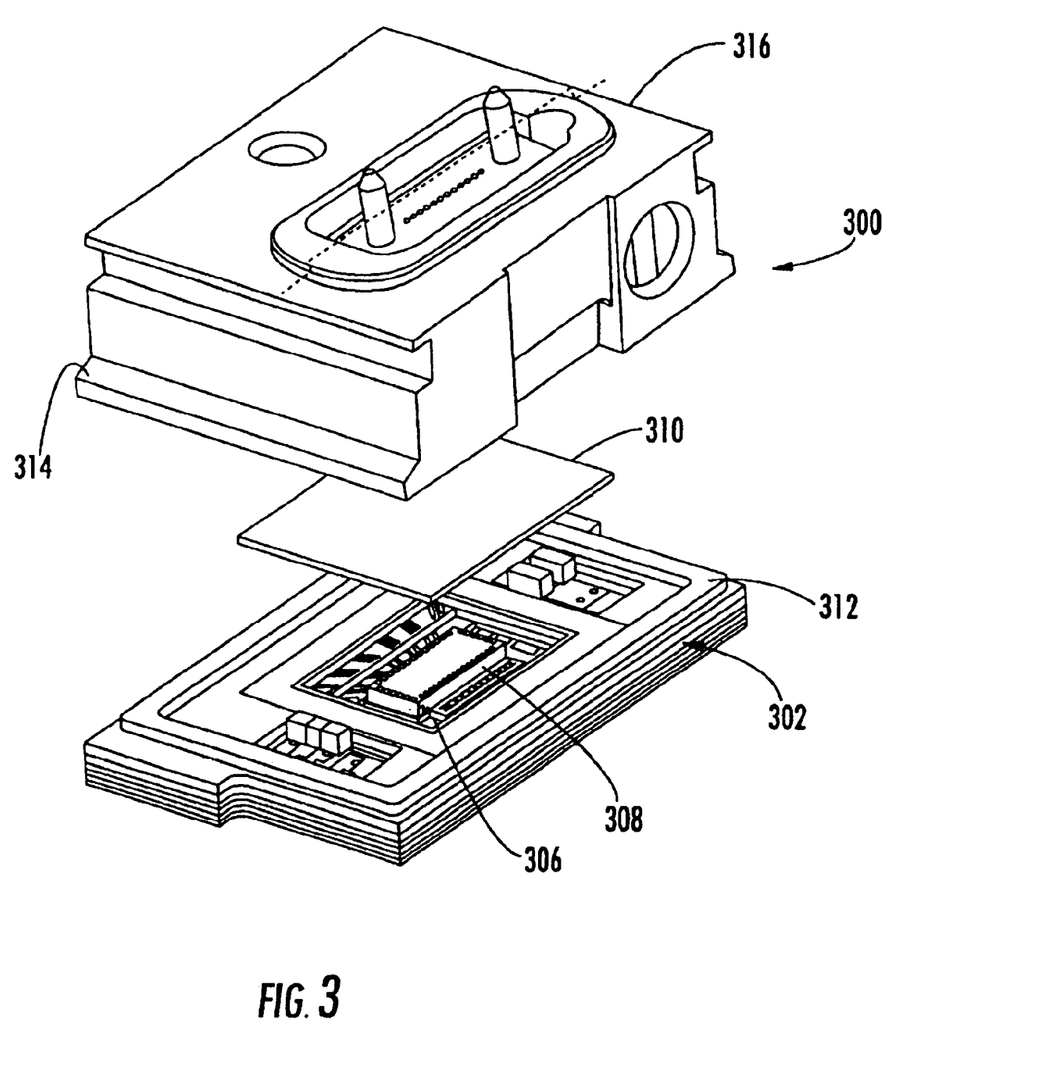
FIG. 3 is a perspective view of various components of a hermetically sealed optical subassembly according to another alternate embodiment of the present invention.

Referring to FIG. 3, another alternate embodiment of a hermetically sealed optical subassembly 300 according to the present invention includes a ceramic substrate 302 having a cavity 304 for housing optoelectronic devices such as a PIN array 306 and associated circuitry 308, a window 310, a ring 312 having an inner aperture area greater than that of the window and a thickness greater than that of the window, and an FSA retainer 316. The thickness of the window is 200 microns in the exemplary embodiment, and the thickness of the ring is 300 microns. The height difference between the window 310 and the ring 312 decouples the window 310 from contacting the FSA retainer 312.

Figure 3A:
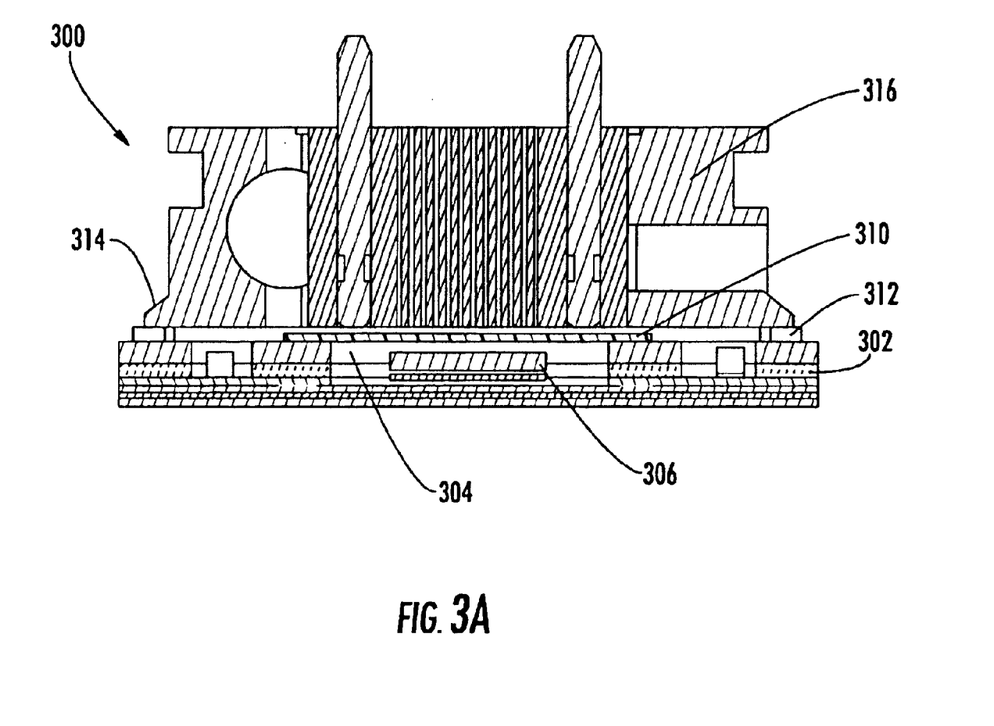
FIG. 3A is a side view, partly in cross section, of the hermetically sealed optical subassembly of FIG. 3.
Figure 3B:
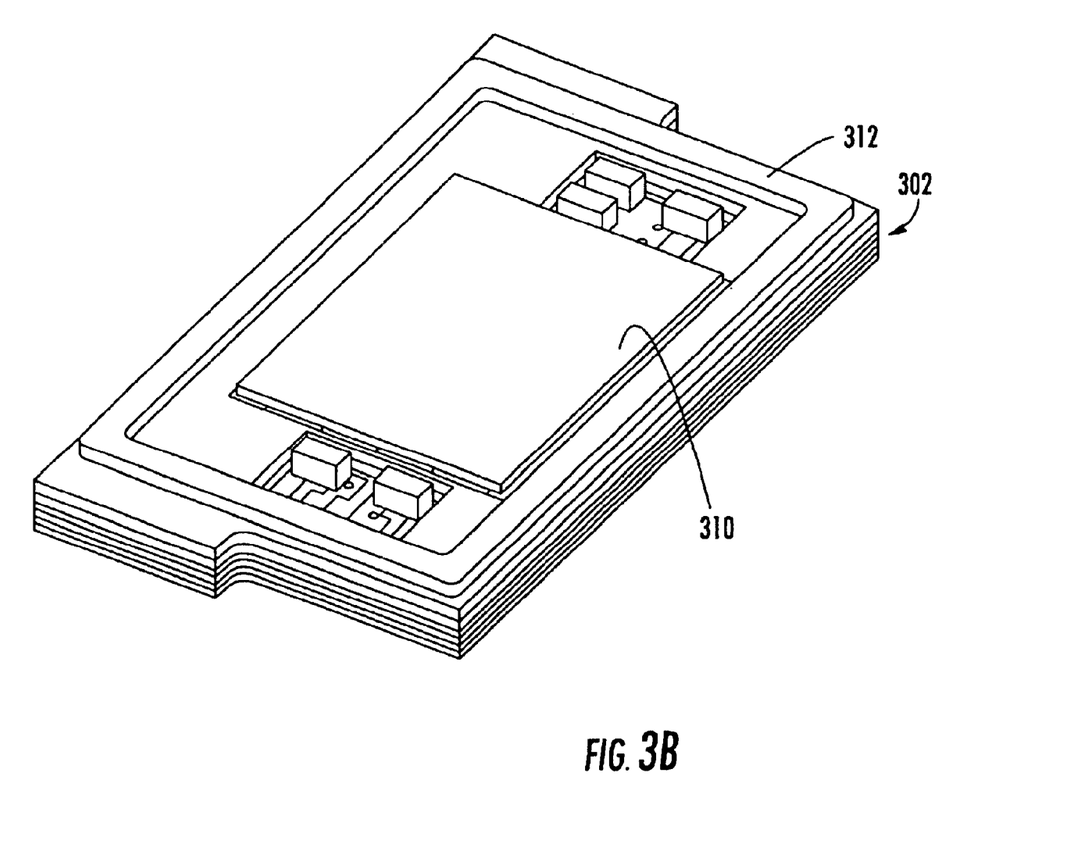
FIG. 3B is a perspective view of a portion of the embodiment of FIG. 3 illustrating a silicon window and metal ring over a ceramic substrate.

Referring to FIGS. 3A and 3B, this embodiment is manufactured by braze attaching the ring 312, made of Kovar or other suitable material in the exemplary embodiment, to the ceramic substrate 302. The PIN array 306 is then attached within the cavity 304 and wire bonded or otherwise electrically enabled. Then, the window is metalized 332 around its periphery by any suitable method to provide edge stabilization and to facilitate solder attachment to the substrate 302. Next, the metalized window 310 is attached over the cavity and reflow soldered to the substrate to create a hermetic seal. The FSA retainer 316 is then brought in contact with the ring 312 and may be aligned with the PIN array and laser welded to the ring to complete the ROSA. The FSA retainer may include a heel 314 for facilitating laser welding to the ring.

This embodiment provides further advantages. Because the ring has a thickness greater than the Si window, the Si window is completely decoupled from the FSA retainer, thereby further reducing the possibility of cracking due to variation in the CTEs of window material and the material (e.g., metal) forming the retainer.

Figure 4:
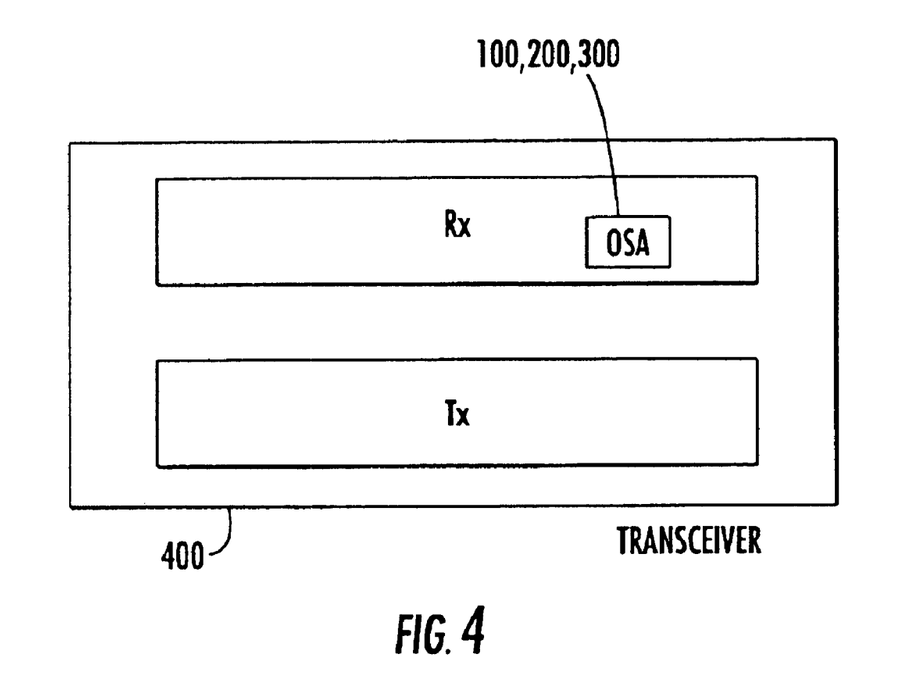
FIG. 4 is a block diagram of a transceiver incorporating the optical subassembly of the present invention.

Referring to FIG. 4, a transceiver 400 according to the present invention having TX 402 and RX 404 portions may include any embodiment of optical subassemblies (100, FIG. 1; 200, FIG. 2; 300, FIG. 3) described herein. The optical subassembly may be included in the transceiver or any other higher level assembly as is well understood in the art.

It will be understood that various modifications may be made to the described embodiment without departing from the scope of the present invention. For example, material other than Si and glass that are transparent to the wavelength of light being received or transmitted may be used to form the window. In the embodiments involving a magnetic material such as Kovar, magnets may be used to fix the Kovar ring to the FSA retainer. In alternate embodiments, the FSA retainer may be omitted in favor of an MT ferrule or bridging device. Furthermore, the principles disclosed herein are applicable to ROSAs having a single detector as opposed to an array, and to transmitter optical subassemblies (TOSAs).

What is claimed is:

1. An optical subassembly comprising:
   a ceramic carrier, the carrier having an U-shaped like structure with two opposing side wall portions that are connected by a flat mounting base portion, the U-shaped like structure forming an open cavity disposed therein, in which an optoelectronic device is mounted on the base and within the cavity;
   a lens-less retainer for attachment to one or more optical fibers, wherein the retainer is secured to the carrier for optical alignment of the optoelectronic device and the fiber; and
   a window covering the opening in the cavity, and forming a hermetic seal over the optoelectronic device, the window being disposed between the carrier and lens-less retainer and being directly attached to the retainer.

2. The optical subassembly of claim 1, wherein the window comprises silicon.

3. The optical subassembly of claim 1 wherein the window has an index of refraction greater than the index of refraction of air.

4. The optical subassembly of claim 1 wherein the seal meets the requirements of MIL-SPEC 833D.

5. The optical subassembly of claim 1, wherein the optoelectronic device comprises an array of photodetectors.

6. A method for making an optical subassembly comprising:

provide a ceramic carrier, the carrier having an U-shaped like structure with two opposing side wall portions that are connected by a flat mounting base portion, the U-shaped like structure forming an open cavity therein;

mounting at least one optoelectronic device on the base and within the cavity;

metalizing at least a portion of the periphery of a window;

attaching the window to the carrier so that the window extends over the cavity in the carrier and forms a hermetic seal over the optoelectronic device; and optically coupling an end of at least one optical fiber to the optoelectronic device by directly coupling the window to a lens-less retainer which holds the fiber, wherein the index of refraction of the window increases optical path length between the end of the fiber and the optoelectronic device while maintaining coupling efficiency.

7. The method of claim 6 further comprising actively aligning the at least one optoelectronic device to the end of at least one optical fiber.

8. The method of claim 6 further comprising mounting an array of photodetectors within the opening.

9. An optical transceiver comprising at least one hermetically sealed optical subassembly, the subassembly including:

a ceramic carrier, the carrier having an U-shaped like structure with two opposing side wall portions that are connected by a flat mounting base portion, the U-shaped like structure forming an open cavity disposed therein, in which an optoelectronic device is mounted on the base and within the cavity;

a lens-less retainer for attachment to an optical fiber stub array, wherein the retainer is secured to the carrier for optical alignment of the optoelectronic device and an optical fiber; and a window covering the opening in the cavity, and forming a hermetic seal over the optoelectronic device, the window being disposed between the carrier and lens-less retainer and being directly attached to the retainer.

* * * * *